United States Patent
Silberring

[11] 3,729,547
[45] Apr. 24, 1973

[54] PROCESS AND PLANT FOR AMMONIA SYNTHESIS

[75] Inventor: Ludwig Silberring, Zurich, Switzerland

[73] Assignee: Sulzer Brothers, Ltd., Winterthur, Switzerland

[22] Filed: Dec. 14, 1970

[21] Appl. No.: 97,870

[30] Foreign Application Priority Data

Dec. 24, 1969  Switzerland..................19198/69

[52] U.S. Cl..................................................423/359
[51] Int. Cl...................................................C01c 1/04
[58] Field of Search..............................23/199, 289; 423/359

[56] References Cited

UNITED STATES PATENTS 3,368,869  2/1968  Gaumer, Jr......................23/199

Primary Examiner—Oscar R. Vertiz
Assistant Examiner—Hoke S. Miller
Attorney—Kenyon & Kenyon Reilly Carr & Chapin

[57] ABSTRACT

The reformed gas which is produced at 900° C and about 40 atmospheres absolute pressure is cooled to 600° C at a high rate through a working expansion such as in an expansion chamber. This is followed by a heat exchange cooling to obtain medium pressure steam for use in the synthesis process.

3 Claims, 1 Drawing Figure

Patented April 24, 1973  3,729,547
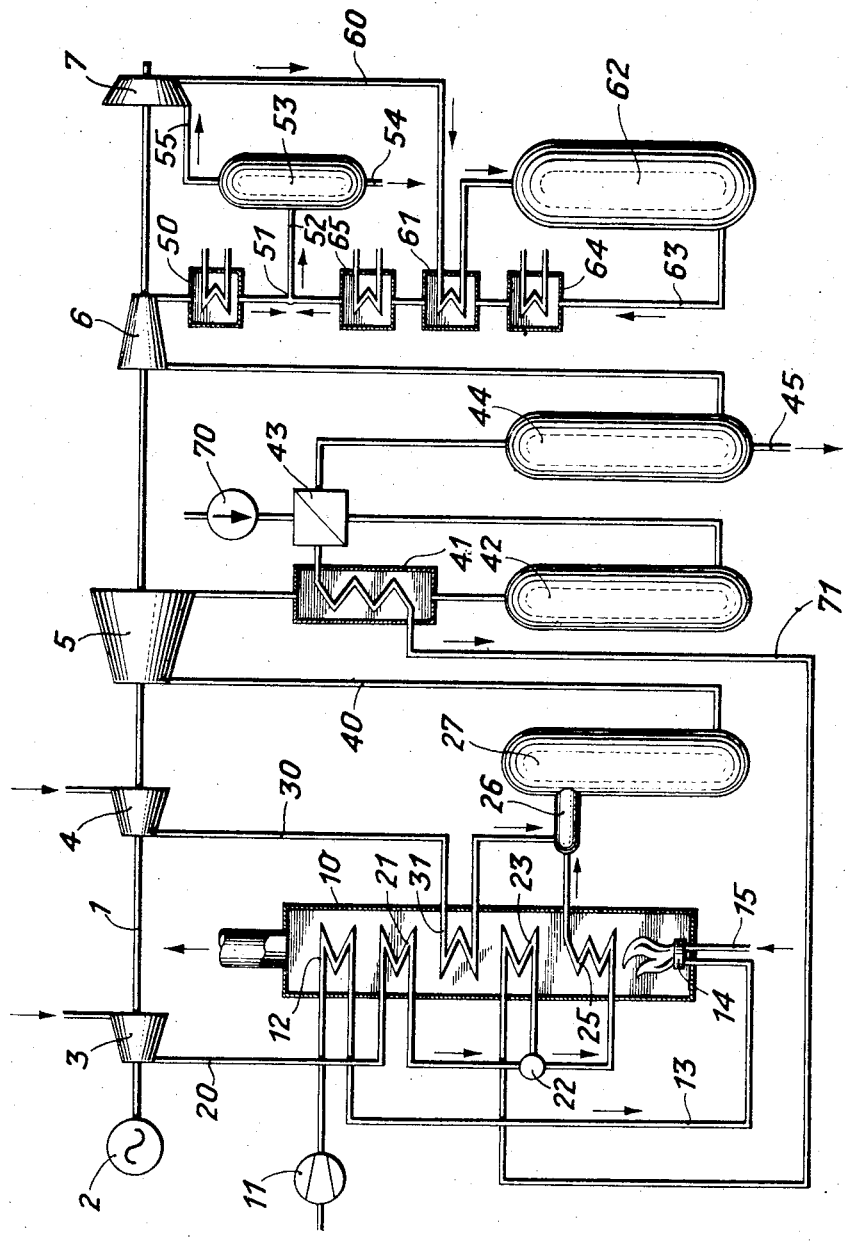

PROCESS AND PLANT FOR AMMONIA SYNTHESIS

This invention relates to a process and plant for ammonia synthesis and, more particularly, to the initial cooling of a reformed gas produced.

In ammonia synthesis, it has been known to produce a gas mixture consisting mainly of hydrogen ($H_2$), water ($H_2O$), carbon monoxide (CO), carbon dioxide ($CO_2$) and nitrogen (N) from a hydrocarbon compound, air and steam. Such a mixture has usually been reformed at a temperature of about 900° C and a pressure of 40 atmospheres absolute. In a following step, the reformed gas has been cooled to about 600° C in a first stage in order to freeze the reaction equilibrium, i.e., to retain at 600° C the reaction equilibrium obtained at 900° C. The carbon ($CO, CO_2$) has then been removed from the reformed gas. The purified reformed gas which is now referred to as synthesis gas and which now consists mainly only of nitrogen and hydrogen, has next been subjected to further cooling. After the synthesis gas pressure has been raised to about 300 atmospheres absolute, the actual ammonia synthesis is carried out at this pressure and at a temperature of about 500° C in a separate synthesis cycle.

It has further been known for the initial cooling of the reformed gas to be carried out in a high-pressure vapor or steam generator and for the live steam produced by the steam generator to be fed to steam turbines which supply the ammonia production plant power requirements and deliver medium-pressure steam for the ammonia synthesis. However, there have been certain structual problems in connection with such a steam generator, since the generator requires a short residence time and hence narrow cross-section ducts on the gas side while the gas flows at high speed through such ducts. If deposits form in these narrow ducts, the high-pressure steam generator may be heated unevenly with a resulting instability on the water side.

Accordingly, it is an object of the invention to eliminate the need for a high pressure steam generator in an ammonia synthesis plant for the initial cooling of a reformed gas.

It is another object of the invention to eliminate the need for steam turbines in an ammonia synthesis plant.

It is another object of the invention to permit the electrical and flow machines of an ammonia synthesis plant to be made of reduced dimensions.

Briefly, the invention provides an ammonia synthesis process, as above, in which the initial cooling of a reformed gas is carried out at a high cooling rate by a working expansion of the reformed gas. This not only allows the elimination of the high pressure steam generator but also is more favorable thermodynamically.

The cooling of the reformed gas by a working expansion is not believed to be obvious since, in fact, the pressure of the reformed gas drops very sharply on expansion, so as to require a subsequent increase for the subsequent synthesis process, namely to about 300 atmospheres absolute. Further, the low pressure of the reformed gas requires a medium-pressure steam generator for the medium-pressure steam used in the synthesis process to have a larger heating surface and requires the $CO–CO_2$ converter and the reformed gas purifying equipment to occupy more space because of the larger volume of reformed gas. These disadvantages, however, are outweighed by the considerable advantages obtained. For example, expansion is advantageously carried out in an expansion turbine in which case the steam turbine can be eliminated, since the expansion turbine performs its function. Also, the expansion cooling of the reformed gas can be followed by a heat-exchange cooling, by means of which the medium-pressure steam used for the synthesis process is obtained. Further, the energy released by the working expansion is at least partly used to compress the synthesis gas and/or other process gases involved such as air or natural gas.

The plant provided by the invention for performing the process comprises a reformed gas producing unit and a cooling device in the form of an expansion machine for the reformed gas. The expansion machine may be an expansion turbine with a rotor shaft which forms a common drive shaft for at least some of the plant compressors and blowers. To simplify the plant layout, it may be advantageous to replace the common shaft at least partly by one or more electrical shafts, for example, by coupling the expansion turbine to a generator and driving the various compressors and blowers by electric motors. The expansion turbine can feed a constant-frequency power system and the electric motors can draw their power requirements from this power system or else the various electrical machines can be connected together to form an internal power system of the plant. The advantage of this variant is that the frequency of the internal power supply of the plant can be higher than the conventional power supply frequency, so that the electrical and the flow machines can be of smaller dimensions.

These and other objects and advantages of the invention will become more apparent from the following detailed description and appended claims taken in conjunction with the accompanying drawing in which:

The drawing illustrates a schematic layout of a plant constructed in accordance with the invention.

The plant includes a shaft 1 on which a motor generator 2, a methane compressor 3, an air compressor 4, an expansion turbine 5, a synthesis gas compressor 6 and a circulating fan or blower 7 are disposed in common. In addition, the plant includes a reformed gas producing means for unit having a furnace 10 which is supplied with air for combustion via a forced draught fan 11, a preheater 12 within the furnace 10, a pipe 13 and a burner 14 connected to the pipe 13. The burner 14 also receives fuel via a pipe 15.

The methane compressor 3 serves to compress natural gas which then passes via a pipe 20 and a preheater 21 in the reforming furnace 10 to a mixer tank 22. The mixer tank 22 is also supplied with a superheated medium-pressure steam from a superheater 23 also disposed in the reforming furnace 10 and serves to mix the methane and steam. The mixture of methane and steam flows through the tubes 25 of the primary reformer, and is then fed to an antechamber 26 of a secondary reformer 27 within the reformed gas producing unit.

The compressor 4 serves to compress air which then flows through a pipe 30 and a process air preheater 31 in the reforming furnace 10 to the ante-chamber 26 of the secondary reformer 27. A reformed gas forms in this secondary reformer 27 and consists mainly of $H_2$, $H_2O$, $CO$, $CO_2$, and $N_2$, at a temperature of 900° C and a pressure of 40 atmospheres absolute. The reformed gas then flows through a pipe 40 into the expansion turbine 5 from this reformed gas producing unit 10, 27 and is cooled by expansion to 8 atmospheres absolute and by 300° to 600° C. Since this expansion takes place in the very small volume of the gas turbine as compared with a heat exchanger, the rate of cooling the reformed gas is much higher than in a heat exchanger. Accordingly, the reaction equilibrium existing at 900° C in the reformed gas is frozen in (i.e. retained) with practically no shift. The reformed gas is then cooled further in a medium-pressure steam generator 41 connected to an outlet of the expansion turbine, and is then fed to a converter 42, in which the carbon monoxide (CO) fraction of the reformed gas is catalytically burned to form carbon dioxide ($CO_2$) with a simultaneous liberation of hydrogen gas from the water vapor contained in the reformed gas. The reformed gas is cooled further in a downstream feed-water preheater 43, and then flows into a gas scrubber means 44. The gas scrubber means 44 serves to form the synthesis gas, consisting of one part of nitrogen ($N_2$) by volume and three parts of hydrogen ($H_2$) by volume, and traces of water vapor by separation of carbon monoxide (CO), carbon dioxide ($CO_2$), water and other foreign substances via an outlet 45. The synthesis gas enters the synthesis gas compressor 6 at a temperature of about 20° C and is compressed therein to 300 atmospheres absolute. The compressed synthesis gas is re-cooled to 20° C in a cooler 50 connected to the compressor 6 and at point 51 is mixed with recirculating ammonia-containing synthesis gas. The mixture flows via a pipe 52 into an ammonia separator 53, from which the ammonia is stripped via pipe 54 and expanded by a suitable means (not shown) while the synthesis gas is fed to the circulating fan 7 via a pipe 55. The synthesis gas then passes via pipe 60 to a heat exchanger 61 and heated therein to about 200° C, and is then fed into a synthesis plant 62, in which, heated by recuperative heat, some of the synthesis gas is combined with ammonia at temperatures of about 500° C. The mixture of synthesis gas and ammonia leaves the synthesis plant 62 via a pipe 63 and is cooled in three stages to 20° C in a preheater 64, heat exchanger 61, and cooler 65, and is then mixed, as stated above, at point 51, with the fresh synthesis gas from the synthesis gas compressor 6.

In order to produce the medium-pressure steam used in the process, feed water is fed by a feed pump 70 to the feed pump preheater 43, and is then introduced into the medium-pressure steam generator 41. The saturated steam produced therein passes via pipe 71 to the superheater 23 which is disposed in the reforming furnace 10 and from which, as stated above, the superheated steam is fed to the mixer tank 23. The preheater 64 for the mixture of synthesis gas and ammonia can be provided in the feed water pipe between the feed water preheater 43 and the medium-pressure steam generator 41.

What is claimed is:

1. An ammonia synthesis process comprising the steps of
    producing a reformed gas in a reformed gas producing unit at a first temperature of about 900° C and at a predetermined high pressure;
    subsequently expanding the reformed gas to cool the reformed gas to a temperature of about 600° C while retaining the reaction equilibrium of the gas at said first temperature and while reducing the pressure of the reformed gas and obtaining mechanical energy for at least partial use in thereafter compressing at least a synthesis gas; and
    thereafter forming a synthesis gas from the reformed gas.

2. An ammonia synthesis process as set forth in claim 1 which further includes the subsequent step of subjecting the cooled gas to a further cooling under heat exchange prior to formation of the synthesis gas.

3. An ammonia synthesis process as set forth in claim 1 wherein the reformed gas consists mainly of hydrogen, water vapor, carbon monoxide, carbon dioxide and nitrogen and wherein said step of forming a synthesis gas includes the step of removing the water vapor, carbon monoxide and carbon dioxide from the reformed gas.

* * * * *